United States Patent
Musashi et al.

(10) Patent No.: US 7,511,922 B2
(45) Date of Patent: Mar. 31, 2009

(54) HEAD SLIDER HAVING GROOVE ON MEDIUM-OPPOSED SURFACE AND RECORDING MEDIUM DRIVE EMPLOYING THE SAME

(75) Inventors: Takayuki Musashi, Kawasaki (JP); Yoshiharu Kasamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 224 days.

(21) Appl. No.: 11/077,305

(22) Filed: Mar. 10, 2005

(65) Prior Publication Data
US 2005/0157426 A1   Jul. 21, 2005

Related U.S. Application Data

(63) Continuation of application No. PCT/JP02/13696, filed on Dec. 26, 2002.

(51) Int. Cl.
*G11B 5/48* (2006.01)
(52) U.S. Cl. ................................... 360/235.7
(58) Field of Classification Search ............... 360/235.7
See application file for complete search history.

(56) References Cited

U.S. PATENT DOCUMENTS

| | | | | |
|---|---|---|---|---|
| 4,802,042 A | * | 1/1989 | Strom | 360/236.3 |
| 5,270,889 A | * | 12/1993 | Muratomi | 360/246.2 |
| 5,704,112 A | * | 1/1998 | Katase et al. | 29/603.12 |
| 5,751,517 A | * | 5/1998 | Agarwal | 360/235.4 |
| 5,991,118 A | * | 11/1999 | Kasamatsu et al. | 360/236.6 |
| 6,040,965 A | * | 3/2000 | Terunuma et al. | 360/236.5 |
| 6,104,571 A | * | 8/2000 | Kabasawa | 360/236.4 |
| 6,125,004 A | * | 9/2000 | Katase et al. | 360/234.3 |
| 6,396,663 B1 | * | 5/2002 | Kasamatsu | 360/235.8 |
| 6,603,639 B1 | * | 8/2003 | Polycarpou et al. | 360/235.8 |
| 6,657,820 B2 | * | 12/2003 | Kohira et al. | 360/236.3 |

FOREIGN PATENT DOCUMENTS

| | | | |
|---|---|---|---|
| JP | 06028804 A | * | 2/1994 |
| JP | 8-255329 | | 10/1996 |
| JP | 2000-137966 | | 5/2000 |
| JP | 2000-260144 | | 9/2000 |

* cited by examiner

*Primary Examiner*—David D Davis
(74) *Attorney, Agent, or Firm*—Greer, Burns & Crain, Ltd.

(57) ABSTRACT

A medium-opposed surface of a slider body is opposed to a recording medium. A rail is defined on the medium-opposed surface. A groove is defined on the medium-opposed surface between the trailing end of the rail and the trailing end of the medium-opposed surface. A lubricating agent is forced to flow into the groove based on the meniscus effect. Airflow acting on the medium-opposed surface serves to lead the lubricating agent along the groove to the edge of the medium-opposed surface. The lubricating agent is then blown over from the end of the groove at the edge of the medium-opposed surface. The lubricating agent is in this manner prevented from staying between the trailing end of the rail and the trailing end of the medium-opposed surface. The head slider is thus allowed to keep flying in a stable flying attitude.

18 Claims, 5 Drawing Sheets

HEAD SLIDER HAVING GROOVE ON MEDIUM-OPPOSED SURFACE AND RECORDING MEDIUM DRIVE EMPLOYING THE SAME

This Application is a continuation of International Application No. PCT/JP2002/013696, filed Dec. 26, 2002.

BACKGROUND OF THE INVENTION

1. Field of the Invention

The present invention relates to a head slider incorporated within a recording medium drive such as a hard disk drive (HDD), for example. In particular, the invention relates to a head slider comprising a slider body opposing the medium-opposed surface to a recording medium and a rail defined on the medium-opposed surface of the slider body.

2. Description of the Prior Art

A hard disk drive often includes a load/unload mechanism. The load/unload mechanism serves to hold a head slider at a location spaced from the surface of a magnetic recording disk when the magnetic recording disk stands still. The head slider is accordingly prevented from contacting with a lubricating agent spreading over the surface of the magnetic recording disk when the magnetic recording disk stands still.

In general, the head slider includes a rail for defining an air bearing surface on the surface of the rail. A read/write electromagnetic transducer is designed to expose the front end at the air bearing surface. The front end of the read/write electromagnetic transducer is thus opposed to the surface of the magnetic recording disk. The outflow or trailing end of the rail is located closest to the surface of the magnetic recording disk during the flight of the head slider over the magnetic recording disk. The head slider thus often suffers from attachment of the lubricating agent. Airflow generated along the rotating magnetic recording disk blows the lubricating agent toward the flying head slider, for example. This induces the attachment of the lubricating agent to the head slider. In particular, in the case where the trailing end of the rail is shifted from the trailing end of the medium-opposed surface toward the inflow or leading end of the medium-opposed surface, the lubricating agent tends to stay at a step defined between the trailing end of the rail and the medium-opposed surface. The attachment of the lubricating agent serves to disturb the stability of the flying attitude of the head slider.

SUMMARY OF THE INVENTION

It is accordingly an object of the present invention to provide a head slider capable of reliably preventing attachment of a lubricating agent so as to establish a stable flying attitude during flight.

According to the present invention, there is provided a head slider comprising: a slider body opposing a medium-opposed surface to a recording medium; a rail defined on the medium-opposed surface of the slider body; and a groove defined on the medium-opposed surface between the trailing end of the rail and the trailing end of the medium-opposed surface.

A lubricating agent is forced to flow into the groove between the trailing end of the rail and the trailing end of the medium-opposed surface based on the meniscus effect. Airflow acting on the medium-opposed surface serves to lead the lubricating agent along the groove to the edge of the medium-opposed surface. The lubricating agent is then blown over from the end of the groove at the edge of the medium-opposed surface. The lubricating agent is in this manner prevented from staying between the trailing end of the rail and the trailing end of the medium-opposed surface. The head slider is thus allowed to keep flying in a stable flying attitude.

The groove may extend from the trailing end of the rail to the trailing end of the medium-opposed surface. In this case, the depth of the groove may increase as the groove gets closer to the trailing end of the medium-opposed surface. The increased depth of the groove serves to promote the flow of the lubricating agent. Otherwise, the groove may extend in parallel with the trailing end of the medium-opposed surface. In this case, the depth of the groove may get larger at a location farther from the longitudinal centerline of the medium-opposed surface. In either case, an air bearing surface may be defined on the rail so as to expose the front end of the head element. The head slider gets closest to the recording medium at the air bearing surface.

The head slider may be utilized in a recording medium drive such as a hard disk drive (HDD), for example. Here, a load/unload mechanism may be employed in the recording medium drive for holding the head slider at location spaced from the recording medium when the recording medium stands still. The load/unload mechanism may include: a load member associated with the head slider; and a ramp member designed to receive the load member.

In general, when the outflow end of the rail is spaced from the outflow end of the medium-opposed surface in the forward direction, the lubricating agent tends to stay at a step defined between the outflow end of the rail and the medium-opposed surface. The lubricating agent on the surface of the rail easily spreads over. This attachment of the lubricating agent often hinders the head slider from flying in a stable flying attitude. On the other hand, the head slider contacts the surface of the recording medium prior to stoppage of the recording medium in a so-called contact start stop (CSS) control. The contact induces the movement of the lubricating agent from the head slider to the surface of the recording medium. However, in the case where the load/unload mechanism is employed in the aforementioned manner, the head slider is kept away from the surface of the recording medium even when the recording medium stands still. There is no opportunity to allow the lubricating agent on the head slider to move to the recording medium. Unless the groove is formed in the aforementioned manner, the lubricating agent stays on the head slider.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
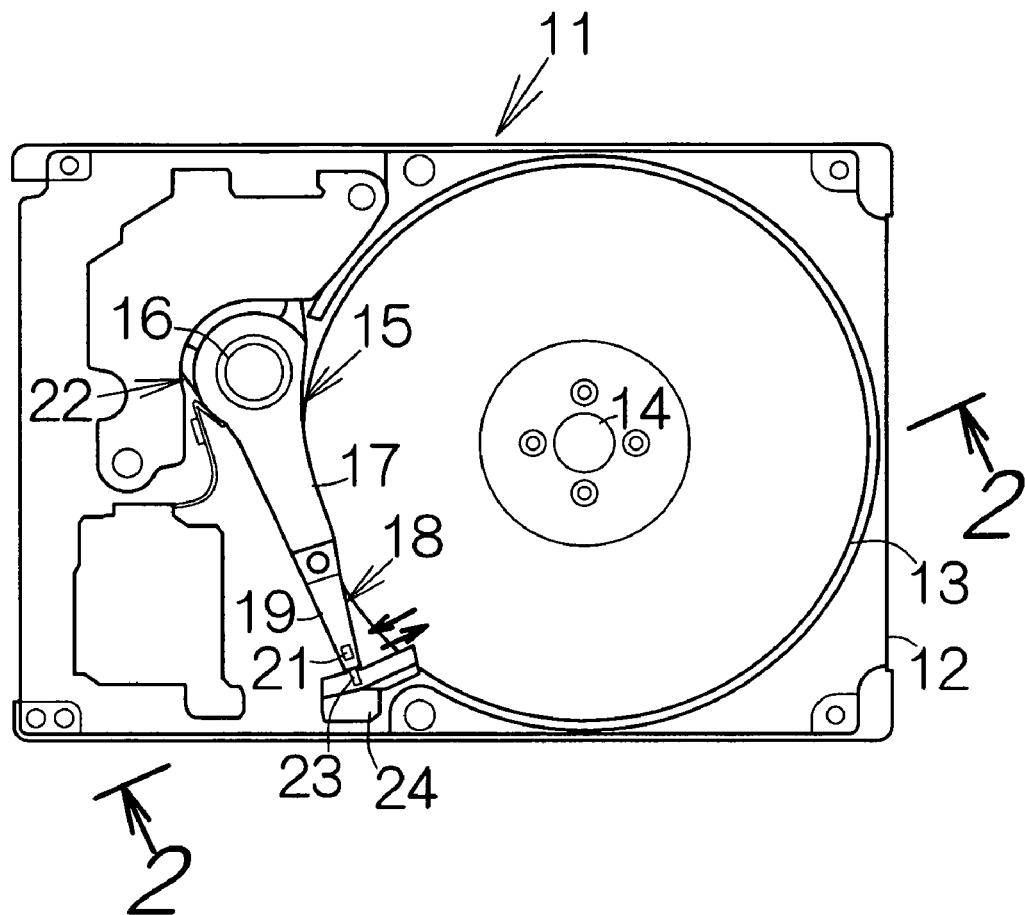
FIG. 1 is a plan view schematically illustrating the structure of a hard disk drive (HDD) as an example of a recording medium drive.

FIG. 1 schematically illustrates the inner structure of a hard disk drive (HDD) 11 as an example of a magnetic recording disk drive or storage device according to an embodiment of the present invention. The HDD 11 includes a box-shaped main enclosure 12 defining an inner space of a flat parallelepiped, for example. At least one magnetic recording disk 13 is contained within the main enclosure 12. The magnetic recording disk or disks 13 is mounted on the driving shaft of a spindle motor 14. The spindle motor 14 is allowed to drive the magnetic recording disk or disks 13 for rotation at a higher revolution speed such as 5,400 rpm, 7,200 rpm, 10,000 rpm, or the like, for example. A cover, not shown, is coupled to the main enclosure 12 so as to define the closed inner space between the main enclosure 12 and the cover itself.

A head actuator 15 is also contained in the inner space of the main enclosure 12. The head actuator 15 is connected to a vertical support shaft 16 for relative rotation. The head actuator 15 includes rigid actuator arms 17 extending in the horizontal direction from the vertical support shaft 16. Head suspension assemblies 18 are fixed to the corresponding tip ends of the actuator arms 17 so as to further extend in the forward direction from the actuator arms 17. The actuator arms 17 are related to the front and back surfaces of the magnetic recording disk 13, respectively.

The head suspension assembly 18 includes a load beam 19. The load beam 19 is connected to the front end of the actuator arm 17 through a so-called elastic deformable region. The elastic deformable region serves to apply a predetermined urging force to the front end of the load beam 19 toward the surface of the magnetic recording disk 13. A flying head slider 21 is supported at the front end of the load beam 19. The flying head slider 21 is received on a gimbal, not shown, attached to the load beam 19. The gimbal serves to allow the flying head slider 21 to change its attitude.

As is apparent from FIG. 1, the actuator arm 17 is positioned at an inoperative position when the magnetic recording disk 13 stands still. When the actuator arm 17 is positioned at the inoperative position in this manner, the front end of the head suspension assembly 18 stays outside the outer periphery of the magnetic recording disk 13. The actuator arm 17 swings around the support shaft 16 from the inoperative position. The swinging movement of the actuator arm 17 around the support shaft 16 allows the front end of the head suspension assembly 18 to cross a data zone defined between the innermost and outermost recording tracks. A power source 22 such as a voice coil motor (VCM) may be employed to realize the swinging movement of the actuator arm 17, for example.

When the magnetic recording disk 13 rotates, the flying head slider 21 is allowed to receive airflow generated along the rotating magnetic recording disk 13. The airflow serves to generate a positive pressure or lift as well as a negative pressure on the flying head slider 21, as described later. The flying head slider 21 is thus allowed to keep flying above the surface of the magnetic recording disk 13 during the rotation of the magnetic recording disk 13 at a higher stability established by the balance between the urging force of the load beam 19 and the combination of the lift and the negative pressure. When the actuator arm 17 is driven to swing in the aforementioned manner during the flight of the flying head slider 21, the flying head slider 21 can be positioned right above a target recording track on the magnetic recording disk 13. When the actuator arm 17 is positioned at the inoperative position, the flying head slider 21 reaches a position outside the magnetic recording disk 13 beyond the outermost recording track.

A load bar 23 is attached to the front or tip end of the load beam 19 so as to further extend in the forward direction from the load beam 19. The load bar 23 is allowed to move in the radial direction of the magnetic recording disk 13 based on the swinging movement of the actuator arm 17. A ramp member 24 is located outside the magnetic recording disk 13 on the path of movement of the load bar 23. When the actuator arm 17 is kept at the inoperative position, the ramp member 24 is allowed to receive the load bar 23. The combination of the load bar 23 and the ramp member 24 establishes a so-called load/unload mechanism.

Figure 2:
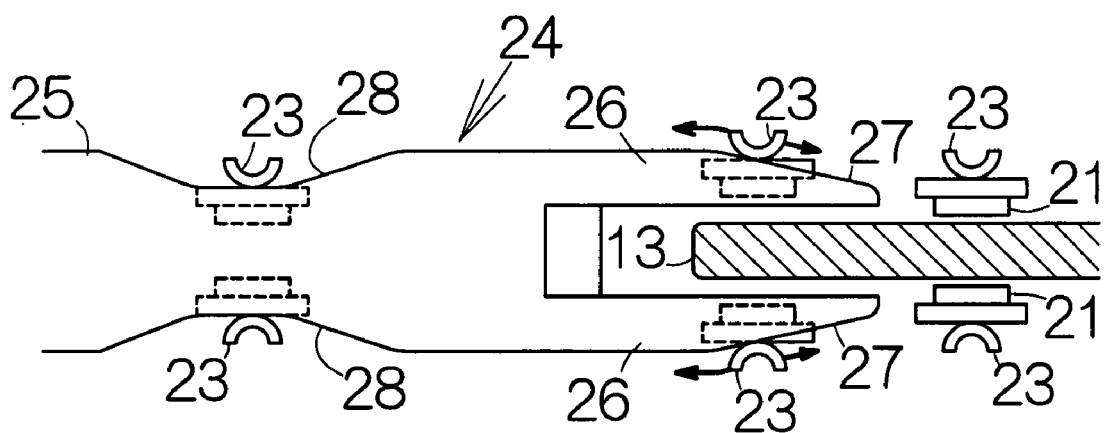
FIG. 2 is an enlarged partial sectional view taken along the line 2-2 in FIG. 1.

As shown in FIG. 2, the ramp member 24 includes an arm member 25 extending from an attachment base, not shown, in the horizontal direction toward the rotation axis of the magnetic recording disk 13. The attachment base may be screwed to the bottom plate of the main enclosure 12, for example. A pair of ramp 26, 26 is formed on the arm member 25. The ramps 26 are designed to get opposed to non-data zones defined on the front and back surfaces of the magnetic recording disk 13 outside the outermost recording track. The ramps 26 may be integral to the arm member 25. Slants 27, 27 are defined on the ramps 26, 26, respectively. The slant 27 is designed to get distanced from the magnetic recording disk 13 at a location farther from the rotation axis of the magnetic recording disk 13. The slants 27 are located on the path of movement of the load bar 23.

Now, assume that the magnetic recording disk 13 stops rotating. When information data has been read out or written in, the power source 22 drives the actuator arm 17 in the normal direction toward the inoperative position. When the flying head slider 21 is opposed to the non-data zone or landing zone outside the outermost recording track, the load bar 23 contacts the slant 27 on the ramp 26. A further swinging movement of the actuator arm 17 allows the load bar 23 to move upward along the slant 27. The flying head slider 21 gradually gets distanced from the surface of the magnetic recording disk 13 as the load bar 23 moves upward along the slant 27. The load bar 23 is in this manner received on the ramp member 24. When the actuator arm 17 has reached the inoperative position, the load bar 23 gets into a depression 28. The magnetic recording disk 13 then stops rotating. Since the load bar 23 is held on the ramp member 24, the flying head slider 21 is prevented from collision against or contact with the magnetic recording disk 13 even if the flying head slider 21 fails to receive airflow.

When the HDD 11 receives instructions for reading or writing the information data, the magnetic recording disk 13 first starts rotating. When the rotation of the magnetic recording disk 13 enters the steady condition, the power source 22 drives the actuator arm 17 in the reverse direction opposite to the aforementioned normal direction. The load bar 23 moves from the depression 28 toward the slant 27. A further swinging movement of the actuator arm 17 allows the load bar 23 to move downward along the slant 27.

The flying head slider 21 gets opposed to the surface of the magnetic recording disk 13 during the downward movement of the load bar 23 along the slant 27. The flying head slider 21 is thus allowed to receive airflow generated along the surface of the rotating magnetic recording disk 13. A further swinging movement of the actuator arm 17 allows the load bar 23 to take off from the slant 27, namely from the ramp member 24. Since the magnetic recording disk 13 rotates in the steady state, the flying head slider 21 is allowed to fly above the surface of the magnetic recording disk 13 without a support of the ramp member 24.

Figure 3:
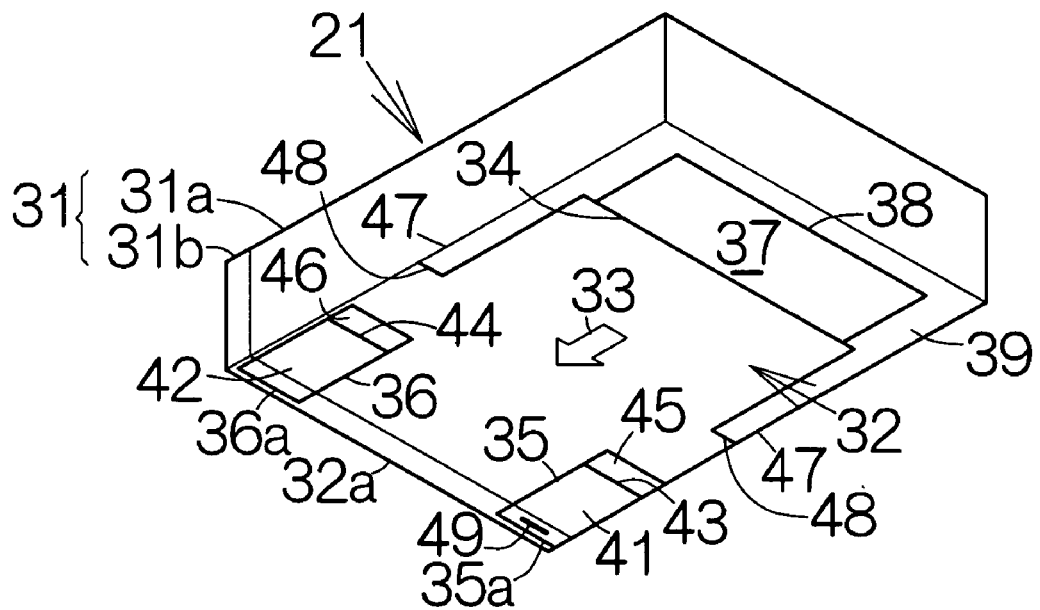
FIG. 3 is an enlarged perspective view schematically illustrating a flying head slider according to a first embodiment of the present invention.

FIG. 3 illustrates an example of the flying head slider 21 according to a first embodiment of the present invention. The flying head slider 21 includes a slider body 31 of a flat parallelepiped, for example. The slider body 31 is designed to oppose a medium-opposed surface or bottom surface to the magnetic recording disk 13. A flat base surface 32, namely a datum plane is defined over the bottom surface. When the magnetic recording disk 13 rotates, the bottom surface receives airflow 33 flowing from the front or leading end of the slider body 31 to the rear or trailing end of the slider body 31. The slider body 31 may include a base material 31a made of $Al_2O_3$—TiC and an alumina ($Al_2O_3$) film 31b overlaid on the outflow end surface of the base material 31a.

A front rail 34 is formed on the slider body 31. The front rail 34 stands upright from the base surface 32 near the inflow or leading end of the bottom surface. The terms "inflow" and "leading" are defined based on the direction of the airflow 33. The front rail 34 extends on the base surface 32 by a predetermined thickness, for example, ranging from 1.5 μm to 2.0 μm approximately, in the lateral direction of the slider body 31 along the inflow end of the slider body 31.

A pair of rear rail 35, 36 is likewise formed on the slider body 31. The rear rails 35, 36 stand upright from the base surface 32 near the outflow or trailing end of the bottom surface. The terms "outflow" and "trailing" are likewise defined based on the direction of the airflow 33. The rear rails 35, 36 are spaced from each other in the lateral direction of the slider body 31. The passage of the airflow 33 is formed between the rear rails 35, 36. The rear rails 35, 36 extend on the base surface 32 by the thickness equal to the thickness of the front rail 34 toward the outflow or trailing end 32a of the base surface 32. The outflow ends 35a, 36a of the rear rails 35, 36 are located at positions slightly spaced from the outflow end 32a of the bottom surface, namely of the base surface 32.

A front air bearing surface (ABS) 37 is defined on the top surface of the front rail 34. The front air bearing surface 37 extends in the lateral direction of the slider body 31, for example. A step 38 is defined on the top surface of the front rail 34 at the inflow end of the front air bearing surface 37. The step 38 serves to define a lower level surface 39 on the top surface of the front rail 34. The lower level surface 39 extends at the level lower than the level of the front air bearing surface 37. When the magnetic recording disk 13 keeps rotating, airflow generated along the surface of the magnetic recording disk 13 flows through the lower level surface 39 and the step 38 to the front air bearing surface 37. The step 38 serves to generate a larger positive pressure or a larger lift at the front air bearing surface 37.

First and second rear air bearing surfaces 41, 42 are defined on the top surfaces of the rear rails 35, 36, respectively. A step 43 is defined on the top surface of the rear rail 35 at the inflow end of the first rear air bearing surface 41. A step 44 is also defined on the top surface of the rear rail 36 at the inflow end of the second rear air bearing surface 42. The steps 43, 44 serve to define lower level surfaces 45, 46 on the top surfaces of the rear rails 35, 36. The lower level surfaces 45, 46 extend at the level lower than the level of the first and second rear air bearing surfaces 41, 42. When the magnetic recording disk 13 keeps rotating, airflow generated along the surface of the magnetic recording disk 13 flows through the lower level surfaces 45, 46 and the steps 43, 44 to the first and second rear air bearing surfaces 41, 42. The steps 43, 44 serve to generate a larger positive pressure or a larger lift at the first and second rear air bearing surfaces 41, 42.

Side rails 47 are connected to the opposite ends of the front rail 34, respectively. The side rails 47 stand upright from the base surface 32 of the slider body 31. The side rail 47 extends toward the outflow end 32a of the base surface 32. The side rails 47 serve to prevent inflow of the airflow, colliding against the front surface of the front rail 34, around the opposite ends of the front rail 34. The airflow thus cannot flow into a space behind the front rail 34 around the opposite ends of the front rail 34. The airflow 33 flowing along the front rail 34 is thus allowed to easily expand in the direction orthogonal to the surface of the magnetic recording disk 13. A rapid expansion of the airflow generates the aforementioned negative pressure. The negative pressure is balanced with the aforementioned lift to stably set a flying height of the slider body 31. Gaps 48 are defined between the side rails 47 and the corresponding rear rails 35, 36. The gaps 47 serve to lead the airflow, flowing around the opposite ends of the front rail 34, into a space between the rear rails 35, 36. The side rails 47 may define the top surface flush with the front air bearing surface 36, for example.

A read/write electromagnetic transducer element 49 is mounted on the slider body 31. The read/write electromagnetic transducer element 49 is embedded in the alumina film 31b of the slider body 31. The read/write electromagnetic transducer element 49 exposes the read gap and write gap at the first rear air bearing surface 41. The read/write electromagnetic transducer element 49 may utilize a write element such as a thin film magnetic head including a thin film coil pattern, for example, and a read element such as a giant magnetoresistive (GMR) element, a tunnel-junction magnetoresistive (TMR) element, or the like.

The flying head slider 21 allows generation of a larger positive pressure or lift at the front air bearing surface 37 as compared with the rear air bearing surfaces 41, 42. Accordingly, the slider body 31 is kept in an inclined attitude of a so-called pitch angle when the slider body 31 flies above the surface of the magnetic recording disk 13. Here, the pitch angle is referred to as an inclination angle in the longitudinal direction of the slider body 31 along the direction of the airflow 33. Distance is thus set smaller between the inflow end of the slider body 31 and the surface of the magnetic recording disk 13 than between the outflow end of the slider body 31 and the surface of the magnetic recording disk 13 based on the pitch angle.

Figure 4:
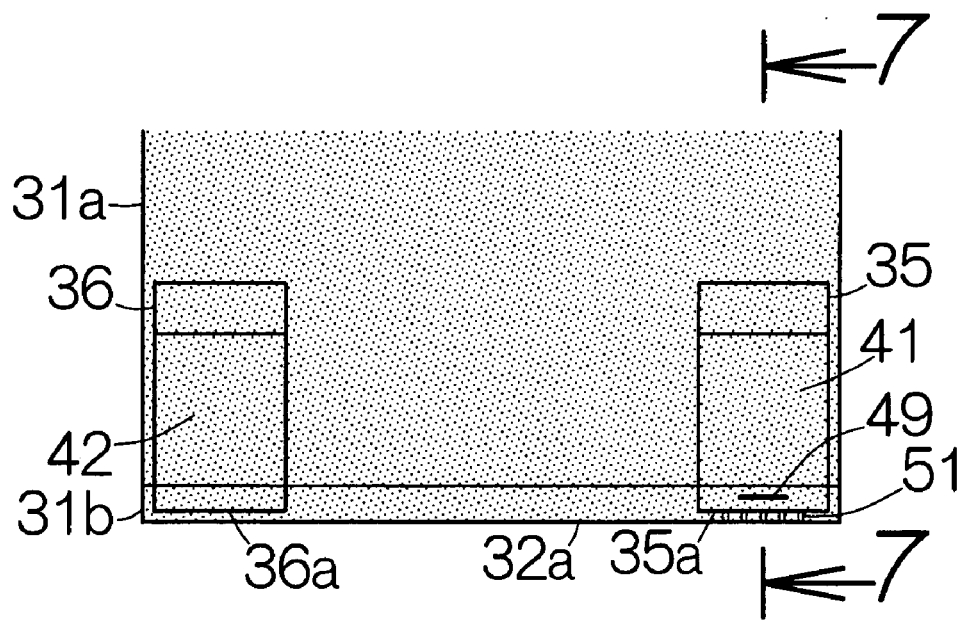
FIG. 4 is an enlarged plan view of a medium-opposed or bottom surface for schematically illustrating the outflow end of the flying head slider.
Figure 5:
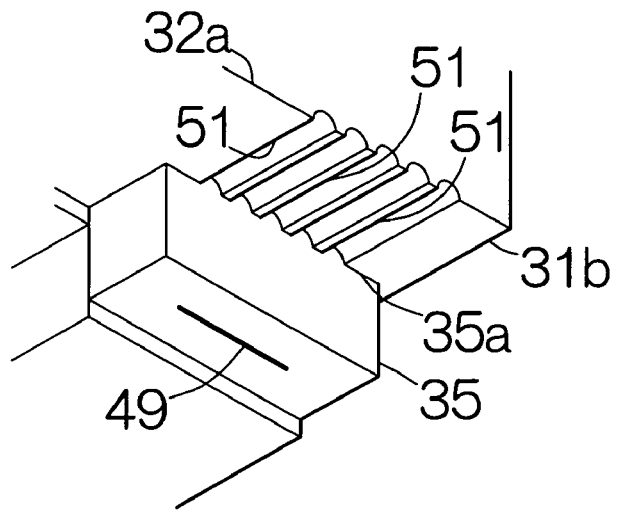
FIG. 5 is an enlarged perspective view illustrating grooves according to a specific example.
Figure 6:
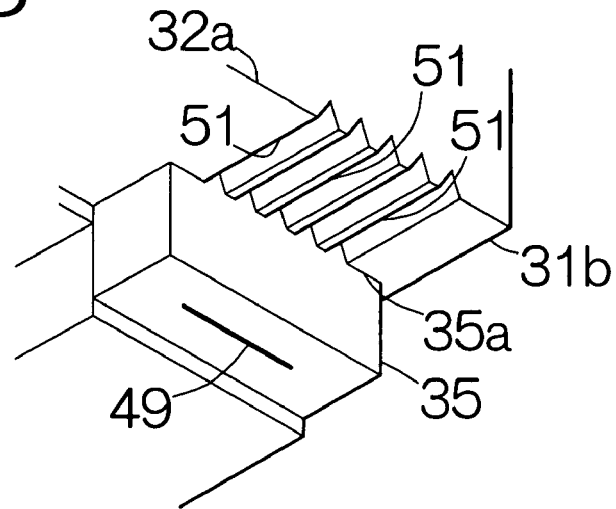
FIG. 6 is an enlarged perspective view illustrating grooves according to another specific example.
Figure 7:
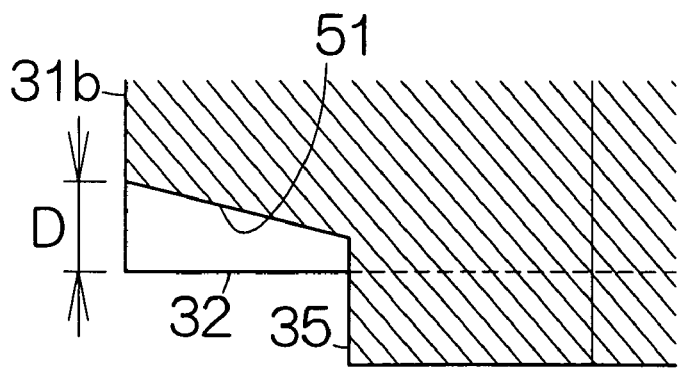
FIG. 7 is an enlarged partial sectional view taken along the line 4-4 in FIG. 7.

As is apparent from FIG. 4, parallel stripes of groove 51 are located between the outflow end 35a of the rear rail 35 and the outflow end 32a end of the base surface 32. The individual grooves 51 extend in the longitudinal direction of the slider body 31 from the outflow end 35a of the rear rail 35 to the outflow end 32a of the base surface 32. The grooves 51 may be carved on the bottom surface at the alumina film 31b of the slider body 31. Focused ion beam (FIB) may be employed to form the grooves 51. It should be noted that any other process may be employed to form the grooves 51. As shown in FIG. 5, the groove 51 may be formed in a semicolumnar space. Alternatively, the groove 51 may be formed in a wedged shape based on a pair of planes intersecting with each other by an acute angle, as shown in FIG. 6. In either case, the depth of the grooves 51 may be set uniform. Otherwise, the depth D of the groove 51 may increase at a position remoter from the rear rail 35, as shown in FIG. 7, for example.

The outflow end 32a of the slider body 31 approaches the magnetic recording disk 13 during the flight of the flying head slider 21. The approach of the slider body 31 often induces attachment of a lubricating agent spreading over the magnetic recording disk 13. The airflow 33 generated along the surface of the rotating magnetic recording disk 13 blows the lubricating agent toward the slider body 31. The lubricating agent adheres to the slider body 31.

The lubricating agent 51 flows into the grooves 51 between the outflow end 35a of the rear rail 35 and the outflow end 32a of the base surface 32. In this case, the airflow 33 generated along the rotating magnetic recording disk 13 serves to drive the lubricating agent toward the outflow end 32a of the base surface 32 along the grooves 51. The lubricating agent is blown over in the air from the rear ends of the grooves 51, namely from the outflow end 32a of the base surface 32. The lubricating agent is thus prevented from staying between the outflow end 35a of the rear rail 35 and the outflow end 32a of the base surface 32. The flying head slider 21 is thus allowed to keep flying in a stable flying attitude.

In general, when the outflow end 35a of the rear rail 35 is spaced from the outflow end 32a of the bottom surface in the forward direction in the aforementioned manner, the lubricating agent tends to stay at a step defined between the outflow end 35a of the rear rail 35 and the bottom surface. The lubricating agent on the surface of the rear rail 35 easily spreads over. This attachment of the lubricating agent often hinders the flying head slider 21 from flying in a stable flying attitude. On the other hand, the flying head slider 21 contacts the surface of the magnetic recording disk 13 prior to termination of the rotation of the magnetic recording disk 13 in a so-called contact start stop (CSS) control. The contact induces the movement of the lubricating agent from the flying head slider 21 to the surface of the magnetic recording disk 13. However, in the case where the load/unload mechanism is employed in the HDD 11 in the aforementioned manner, the flying head slider 21 is kept away from the surface of the magnetic recording disk 13 even when the magnetic recording disk 13 stands still. There is no opportunity to allow the lubricating agent on the flying head slider 21 to move to the magnetic recording disk 13. Unless the grooves 51 are formed in the aforementioned manner, the lubricating agent stays on the flying head slider 21.

Figure 8:
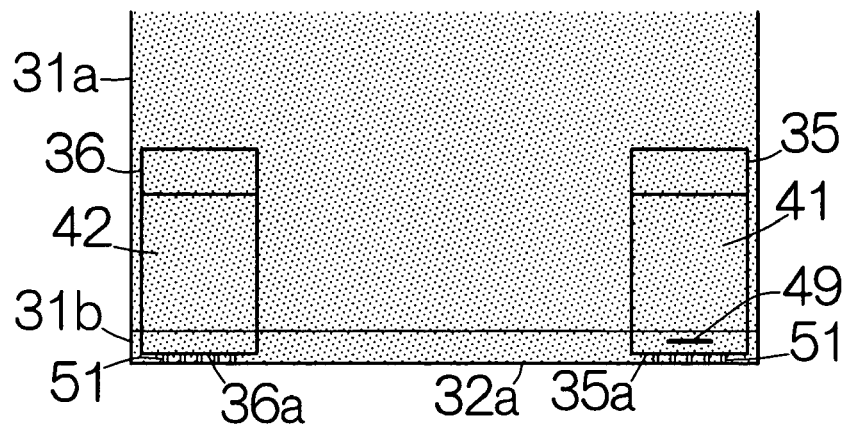
FIG. 8 is an enlarged plan view of the bottom surface for illustrating grooves according to still another example.

As shown in FIG. 8, the flying head slider 21 allows employment of the grooves 51 located between the outflow end 36a of the rear rail 36 and the outflow end 32a of the bottom surface in addition to the aforementioned grooves 51 located between the outflow end 35a of the rear rail 35 and the outflow end 32a of the bottom surface. The grooves 51 serve to efficiently avoid stay of the lubricating agent on the flying head slider 21.

Figure 9:
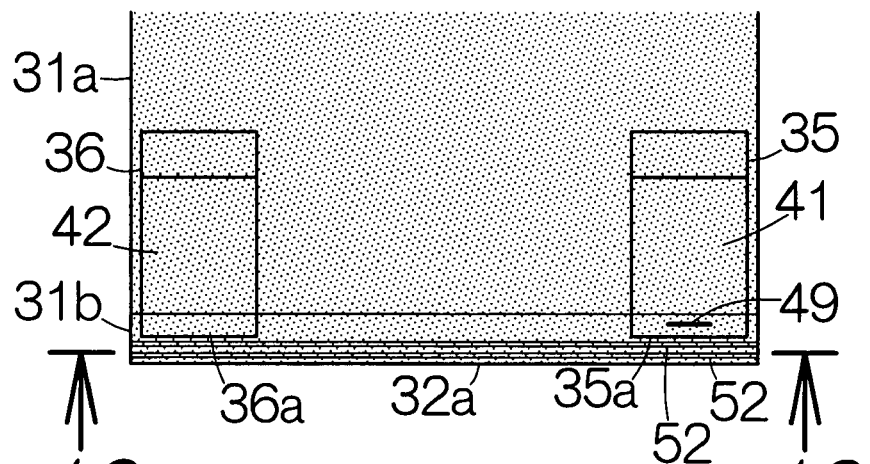
FIG. 9 is an enlarged plan view of the bottom surface for illustrating grooves according to still another example.
Figure 10:
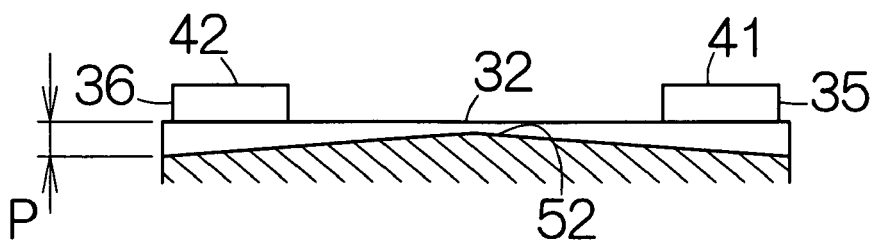
FIG. 10 is a vertical sectional view taken along the line 10-10 in FIG. 9.

As shown in FIG. 9, grooves 52 may be formed on the slider body 31 so as to extend in the lateral direction perpendicular to the longitudinal direction of the slider body 31 between the outflow ends 35a, 36a of the rear rails 35, 36 and the outflow end 32a of the bottom surface. Specifically, the grooves 52 may extend in parallel with the outflow end 32a of the bottom surface. The grooves 52 serves to sufficiently prevent stay of the lubricating agent on the flying head slider 21. For example, the depth P of the grooves 52 may get larger at a location farther from the longitudinal centerline of the bottom surface, as is apparent from FIG. 10. Otherwise, the grooves 52 may be located closer to the outflow end 32a of the bottom surface at a location farther from the longitudinal centerline of the bottom surface.

Figure 11:
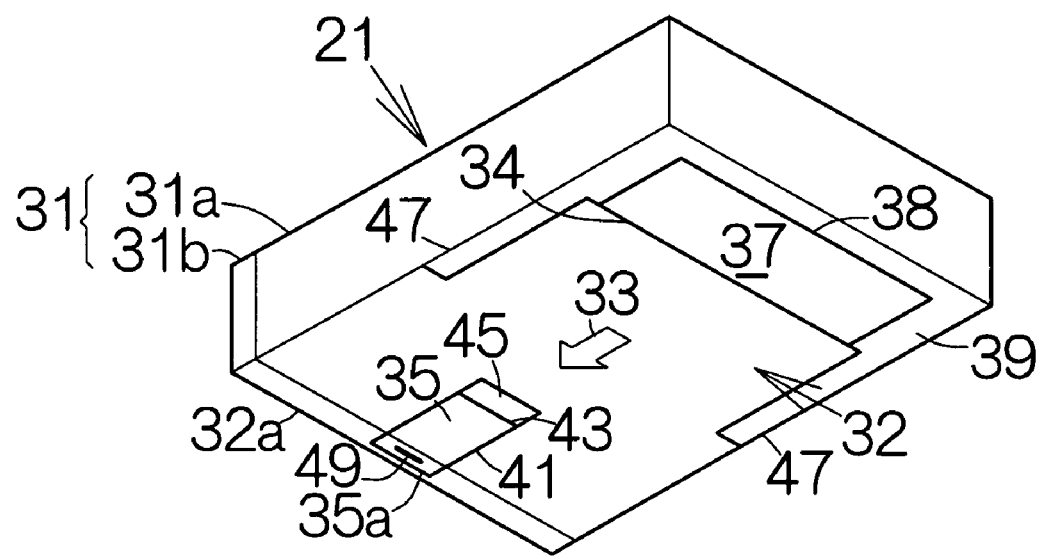
FIG. 11 is an enlarged perspective view schematically illustrating a flying head slider according to a second embodiment of the present invention.
Figure 12:
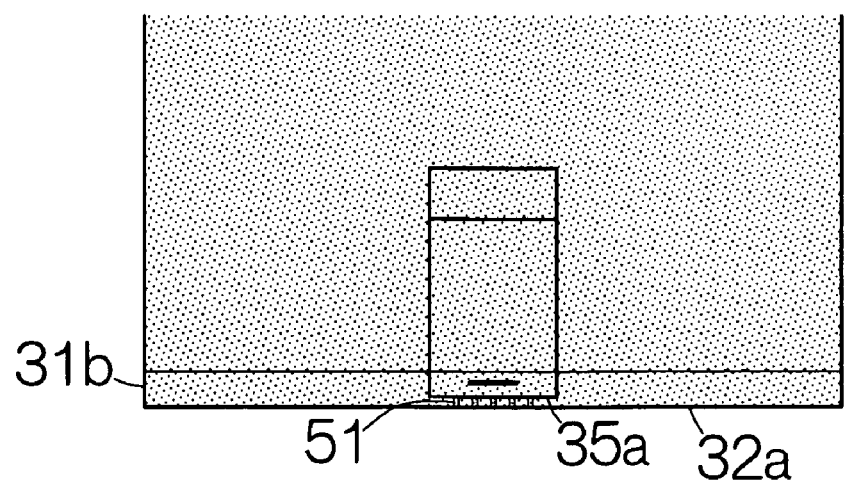
FIG. 12 is an enlarged plan view of a medium-opposed or bottom surface for schematically illustrating the outflow end of the flying head slider.

FIG. 11 illustrates the flying head slider 21a according to a second embodiment of the present invention. The single rear rail 35 is formed on the bottom surface in the flying head slider 21a of the second embodiment in place of the a pair of the rear rail 35, 36. The rear rail 35 is located on the longitudinal centerline of the slider body 31. As shown in FIG. 12, parallel stripes of groove 51 are formed on the slider body 31 between the outflow end 35a of the rear rail 35 and the outflow end 32a of the bottom surface or base surface 32 in the flying head slider 21a. The grooves 51 serve to avoid stay of the lubricating agent in the aforementioned manner. The grooves 51 may be replaced with the aforementioned grooves 52. Like reference numerals are attached to components or structure equivalent to those of the aforementioned first embodiment.

What is claimed is:

1. A head slider comprising:
a slider body opposing a medium-opposed surface to a recording medium, the medium-opposed surface receiving airflow running downstream from a leading end to a trailing end of the medium-opposed surface;
a rail defined on the medium-opposed surface of the slider body;
an air bearing surface defined on the rail;
a transducer element exposing its front end at the air bearing surface; and
a groove defined on the medium-opposed surface between a trailing end of the rail and the trailing end of the medium-opposed surface at a position downstream of the transducer element.

2. The head slider according to claim 1, wherein said groove extends from the trailing end of the rail to the trailing end of the medium-opposed surface.

3. The head slider according to claim 2, wherein depth of the groove increases as the groove gets closer to the trailing end of the medium-opposed surface.

4. The head slider according to claim 1, wherein said groove extends in parallel with the trailing end of the medium-opposed surface.

5. The head slider according to claim 4, wherein depth of the groove gets larger at a location farther from a longitudinal centerline of the medium-opposed surface.

6. The head slider according to claim 1, wherein the groove is located at a position downstream of the air bearing surface.

7. The head slider according to claim 1, wherein the groove is completely defined at a position downstream of the transducer element.

8. A recording medium drive comprising:
a recording medium;
a head slider opposing a medium-opposed surface to the recording medium, the medium-opposed surface receiving airflow running downstream from a leading end to a trailing end of the medium-opposed surface;
a rail defined on the medium-opposed surface of the slider body;
an air bearing surface defined on the rail;
a transducer element exposing its front end at the air bearing surface; and
a groove defined on the medium-opposed surface between a trailing end of the rail and the trailing end of the medium-opposed surface at a position downstream of the transducer element.

9. The recording medium drive according to claim 8, further comprising a load/unload mechanism holding the head slider at a location spaced from the recording medium when the recording medium stands still.

10. The recording medium drive according to claim 9, wherein said load/unload mechanism includes:

a load member associated with the head slider; and a ramp member designed to receive the load member.

11. The recording medium drive according to claim 10, wherein said groove extends from the trailing end of the rail to the trailing end of the medium-opposed surface.

12. The recording medium drive according to claim 11, wherein depth of the groove increases as the groove gets closer to the trailing end of the medium-opposed surface.

13. The recording medium drive according to claim 10, wherein said groove extends in parallel with the trailing end of the medium-opposed surface.

14. The recording medium drive according to claim 13, wherein depth of the groove gets larger at a location farther from a longitudinal centerline of the medium-opposed surface.

15. The head slider according to claim 1, wherein a plurality of said grooves are provided on the medium-opposed surface.

16. The recording medium drive according to claim 8, wherein a plurality of said grooves are provided on the medium-opposed surface.

17. The recording medium drive according to claim 8, wherein the groove is located at a position downstream of the air bearing surface.

18. The recording medium drive according to claim 8, wherein the groove is completely defined at a position downstream of the transducer element.

* * * * *